(12) United States Patent
Kaltenbach et al.

(10) Patent No.: US 8,684,875 B2
(45) Date of Patent: Apr. 1, 2014

(54) DEVICE FOR A DRIVETRAIN OF A HYBRID VEHICLE, DRIVETRAIN, AND METHOD FOR OPERATING SAME

(75) Inventors: Johannes Kaltenbach, Friedrichshafen (DE); Kai Borntraeger, Langenargen (DE)

(73) Assignee: ZF Friedrichshafen AG, Friedrichschafen (DE)

( * ) Notice: Subject to any disclaimer, the term of this patent is extended or adjusted under 35 U.S.C. 154(b) by 0 days.

(21) Appl. No.: 13/993,875

(22) PCT Filed: Nov. 8, 2011

(86) PCT No.: PCT/EP2011/069595
§ 371 (c)(1),
(2), (4) Date: Jun. 13, 2013

(87) PCT Pub. No.: WO2012/084330
PCT Pub. Date: Jun. 28, 2012

(65) Prior Publication Data
US 2013/0267367 A1    Oct. 10, 2013

(30) Foreign Application Priority Data
Dec. 20, 2010    (DE) .......................... 10 2010 063 582

(51) Int. Cl.
*F16H 37/06*    (2006.01)

(52) U.S. Cl.
USPC .......................................................... 475/5

(58) Field of Classification Search
USPC ......... 475/5, 8, 207, 221, 317, 318, 330, 248, 475/332, 269, 209, 218; 477/5; 180/65.22, 180/65.21, 65.1
See application file for complete search history.

(56) References Cited

U.S. PATENT DOCUMENTS

| | | | |
|---|---|---|---|
| 5,337,239 A * | 8/1994 | Okuda ............................ | 701/55 |
| 7,684,919 B2 * | 3/2010 | AbuSamra ...................... | 701/54 |

(Continued)

FOREIGN PATENT DOCUMENTS

| | | |
|---|---|---|
| DE | 10 2006 059 591 A1 | 6/2008 |
| DE | 10 2007 022 774 A1 | 11/2008 |

(Continued)

OTHER PUBLICATIONS

German Search Report Corresponding to 10 2010 063 582.0 mailed Dec. 23, 2011.

(Continued)

*Primary Examiner* — David D Le
*Assistant Examiner* — David J Hlavka
(74) *Attorney, Agent, or Firm* — Michael J. Bujold; Davis & Bujold, PLLC

(57) ABSTRACT

A device for a drive-train of a hybrid vehicle comprising a planetary gearset having three elements which comprise a carrier, a sun gear and a ring gear. A first elements serves as a fixed connection of a first input shaft of a first partial transmission of a transmission. A second of the elements serves as a fixed connection of a hybrid drive electric machine. A first shifting element connects, in a first position thereof, a third of the elements to a second input shaft of a second partial transmission, to which a hybrid drive combustion engine can be coupled. The first shifting element, when in a second position, connects the third of the elements to the housing or the stator. A second shifting element, when engaged, couples the two input shafts of the two partial transmissions with one another and, when disengaged, separates the two input shafts from one another.

21 Claims, 7 Drawing Sheets

(56) References Cited

U.S. PATENT DOCUMENTS

| | | | |
|---|---|---|---|
| 7,865,288 B2 * | 1/2011 | Fukushima et al. | ............ 701/54 |
| 8,075,436 B2 | 12/2011 | Bachmann | |
| 2010/0173746 A1 | 7/2010 | Ideshio et al. | |
| 2010/0282531 A1 | 11/2010 | Janssen | |

FOREIGN PATENT DOCUMENTS

| | | |
|---|---|---|
| DE | 10 2007 042 949 A1 | 4/2009 |
| EP | 0 845 618 A2 | 6/1998 |
| WO | 2009/147501 A2 | 12/2009 |

OTHER PUBLICATIONS

International Search Report Corresponding to PCT/EP2011/069595 mailed Jan. 30, 2012.

Written Opinion Corresponding to PCT/EP2011/069595 mailed Jan. 30, 2012.

* cited by examiner

DEVICE FOR A DRIVETRAIN OF A HYBRID VEHICLE, DRIVETRAIN, AND METHOD FOR OPERATING SAME

This application is a National Stage completion of PCT/EP2011/069595 filed Nov. 8, 2011, which claims priority from German patent application serial no. 10 2010 063 582.0 filed Dec. 20, 2010.

FIELD OF THE INVENTION

The invention concerns a device for a drive-train of a hybrid vehicle, a drive-train of a hybrid vehicle with such a device, and a method for operating the same.

BACKGROUND OF THE INVENTION

From DE 10 2006 059 591 A1 a drive-train of a hybrid vehicle is known, whose drive aggregate is in the form of a hybrid drive comprising an internal combustion engine and an electric machine. Besides the hybrid drive the drive-train known from this prior art comprises a transmission with two partial transmissions connected in parallel, such that the transmission has two transmission input shafts and one transmission output shaft. Furthermore, the drive-train known from this prior art comprises a device which serves for connecting the electric machine of the hybrid drive to the transmission, this device comprising a planetary gear set which as its elements comprises a carrier, a sun gear and a ring gear. The electric machine of the hybrid drive is connected fixed to one element of the planetary gear set, namely its sun gear, and a second element of the planetary gear set, namely a carrier thereof, is connected in a fixed manner to a first transmission input shaft of a first partial transmission of the transmission. A third element of the planetary gear set, namely its ring gear, is connected fixed to a second transmission input shaft of a second partial transmission of the transmission, and in addition the internal combustion engine of the hybrid drive can be coupled to the second transmission input shaft of the second partial transmission by means of a separator clutch. Such a drive-train can provide a defined range of functions for a hybrid vehicle.

There is a need for an operating drive-train of a hybrid vehicle and a device for such a drive-train of a hybrid vehicle, by virtue of which the range of functions of a hybrid vehicle can be extended.

SUMMARY OF THE INVENTION

Starting from there, the purpose of the present invention is to provide a new type of device for a drive-train of a hybrid vehicle, a new type of drive-train, and a method for operating the same.

This objective is achieved by a device according to the invention comprises, on the one hand, a first shifting element by means of which, in a first shift position of the first shifting element, a third element of the elements of the planetary gear set can be coupled to a second transmission input shaft of a second partial transmission of the transmission, to which in addition an internal combustion engine of the hybrid drive can be coupled, and in a second shift position of the first shifting element, it can be connected to the housing or stator, and, on the other hand, a second shifting element, by means of which when the second shifting element is closed the two transmission input shafts of the two partial transmissions can be coupled to one another and when the second shifting element is open, the two transmission input shafts of the two partial transmissions can be separated from one another.

According to the invention it is proposed that the third element of the planetary gear set can be shifted by means of the first shifting element, in such a manner that in the first shift position of the first shifting element, the third element of the planetary gear set can be coupled to the second transmission input shaft, whereas in the second shift position of the first shifting element, the third element of the planetary gear set can be connected to the housing. By means of the second shifting element, which serves as a bridging shifting element, when the second shifting element is closed the two transmission input shafts can be coupled to one another, so that they necessarily rotate at the same speed. In the open condition of the second shifting element, the two transmission input shafts are separated from one another, so that they do not necessarily rotate at the same speed.

With the device according to the invention, in a drive-train of a hybrid vehicle numerous functions or operating conditions can be covered or implemented.

According to an advantageous further development, in a third, open shift position of the first shifting element the third element of the planetary gear set can rotate freely.

When the first shifting element has this third, open shift position, in which the third element of the planetary gear set is neither coupled to the second transmission input shaft of the second partial transmission nor fixed to the housing or stator, the functional range of the hybrid vehicle can again be extended.

BRIEF DESCRIPTION OF THE DRAWINGS

Preferred further developments of the invention emerge from the subordinate claims and the description given below. Example embodiments of the invention, to which it is not limited, are explained in greater detail with reference to the drawing, which shows:

DETAILED DESCRIPTION OF THE PREFERRED EMBODIMENTS

Figure 1:
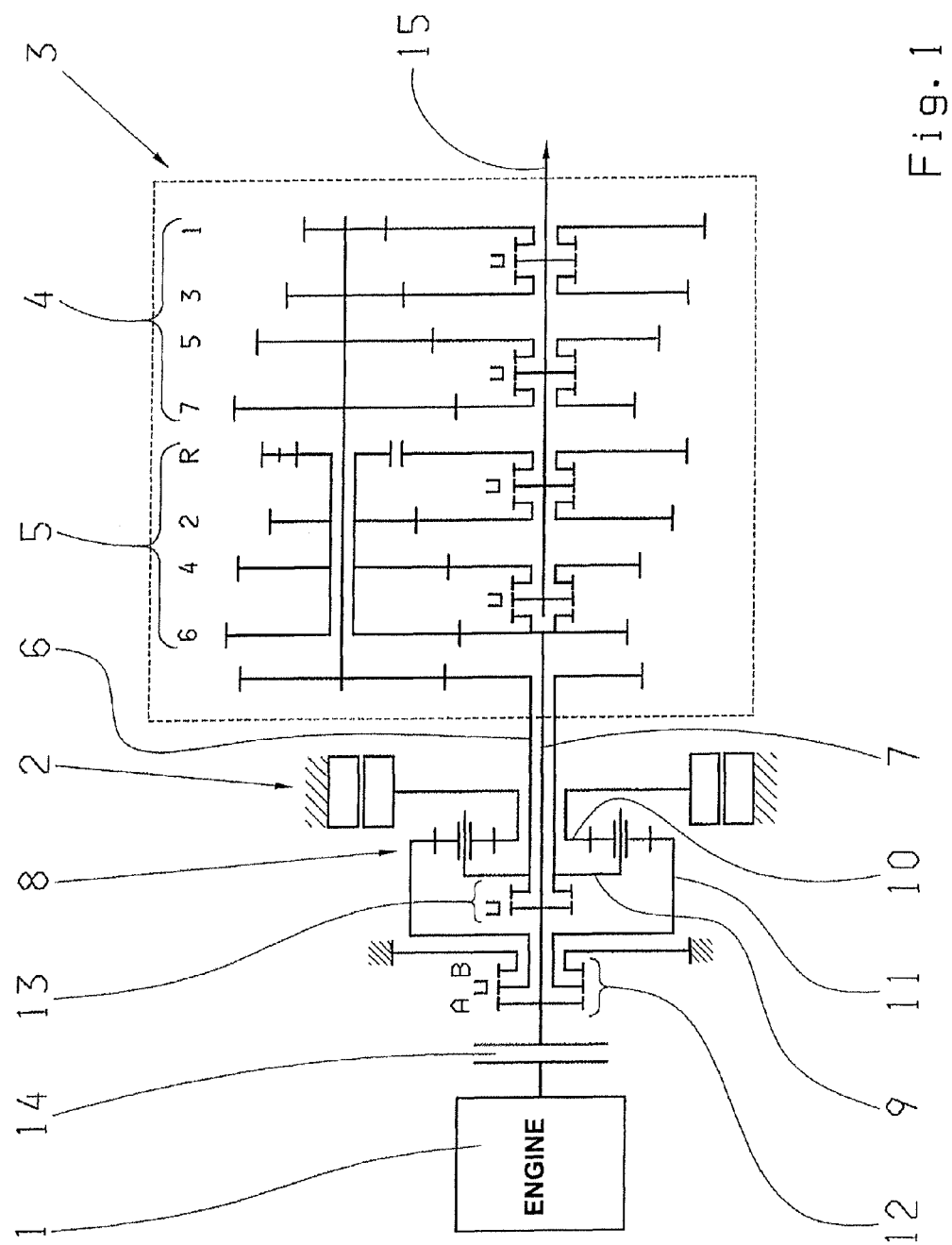
FIG. 1: A schematic representation of a drive-train according to the invention with a device according to the invention, according to a first example embodiment of the invention.

FIG. 1 shows a preferred example embodiment of a drive-train of a hybrid vehicle, the drive-train of FIG. 1 comprising a hybrid drive consisting of an internal combustion engine 1 and an electric machine 2. The drive-train of FIG. 1 also comprises a transmission 3 with two partial transmissions 4 and 5 connected parallel to one another, such that in the example embodiment of FIG. 1 the first partial transmission 4 provides the forward gears "1", "3", "5" and "7" whereas the second partial transmission 5 provides the forward gears "2", "4" and "6" and the reverse gear "R". The transmission 3 with the two partial transmissions 4 and 5 shown as an example in FIG. 1 is a 7-gear dual clutch transmission, although this transmission is not strictly necessary for the invention. Other transmissions with two partial transmissions connected in parallel can also be used. The transmission 3 has two transmission input shafts 6 and 7, namely a first transmission input shaft 6 that co-operates with the first partial transmission 4 and a second transmission input shaft 7 that co-operates with the second partial transmission 5. In the example embodiment shown, the first transmission input shaft 6 is made as a hollow shaft through which the second transmission input shaft 7 extends. In addition the transmission 3 has a single transmission output shaft 15.

The drive-train of FIG. 1 comprises a device for connecting the electric machine 2 to the transmission 3, the device comprising at least a planetary gear set 8 with a carrier 9, a sun gear 10 and a ring gear 11. A first element of these three elements 9, 10 and 11 of the planetary gear set 8, namely in the example embodiment shown in FIG. 1 the carrier 9, is connected to the first transmission input shaft 6 of the first partial transmission 4 of the transmission 3 in a fixed manner. Thus, in the drive-train of FIG. 1 the first transmission input shaft 6 of the first partial transmission 4 is coupled fixedly to the carrier 9 of the planetary gear set 8.

A second element of the elements 9, 10 and 11 of the planetary gear set 8 serves for the fixed connection of the electric machine 2 of the hybrid drive, this second element of the planetary gear set 8 in FIG. 1 being the sun gear 10. In FIG. 1, therefore, the electric machine 2 is connected to the sun gear 10 in a fixed manner.

In addition to the planetary gear set 8, the device of the drive-train in FIG. 1 comprises a first shifting element 12 with at least two shift positions A and B, such that in the first shift position A of the first shifting element 12 a third element of the elements 9, 10, and 11 of the planetary gear set 8, namely in FIG. 1 the ring gear 11, can be coupled to the second transmission input shaft 7 of the second partial transmission 5 of the transmission 3, whereas in a second shift position B of the first shifting element 12 the third element of the planetary gear set 8, namely in FIG. 1 its ring gear 11, can be connected fixed to the housing or stator.

In an advantageous further development of the invention, besides the two closed shift positions A and B, the first shifting element 12 also has a third, open shift position, in which the third element of the planetary gear set 8, namely in FIG. 1 the ring gear 11, is decoupled both from the second transmission input shaft 7 of the second partial transmission 5 and also from the housing or stator, so that the third element of the planetary gear set 8 can then rotate freely.

In addition the device of the drive-train of FIG. 1 comprises a second shifting element 13, this second shifting element 13 having a first, closed shift position and a second, open shift position. When the second shifting element 13 is closed the two transmission input shafts 6 and 7 of the two partial transmissions 4 and 5 are coupled to one another, so that they necessarily rotate at the same speed. When the second shifting element 13 is closed the first element of the planetary gear set 8, in FIG. 1 its carrier 9, is connected to both the first transmission input shaft and the second transmission input shaft 7 of the two partial transmissions 4 and 5 of the transmission 3. When the second shifting element 13 is open the two transmission input shafts 6 and 7 of the partial transmissions 4 and 5 are separated from one another, so they do not necessarily have to rotate at the same speed.

In the open position of the second shifting element 13, the first element of the planetary gear set 8, namely in FIG. 1 the carrier 9, is accordingly coupled exclusively to the first transmission input shaft 6 of the first partial transmission 4.

Furthermore, the drive-train of FIG. 1 comprises a separator clutch 14, this separator clutch 14 being an optional component. By means of the separator clutch 14, the internal combustion engine 1 can be coupled to the second transmission input shaft 7 of the second partial transmission 5 of the transmission 3, and decoupled from it.

Figure 2:
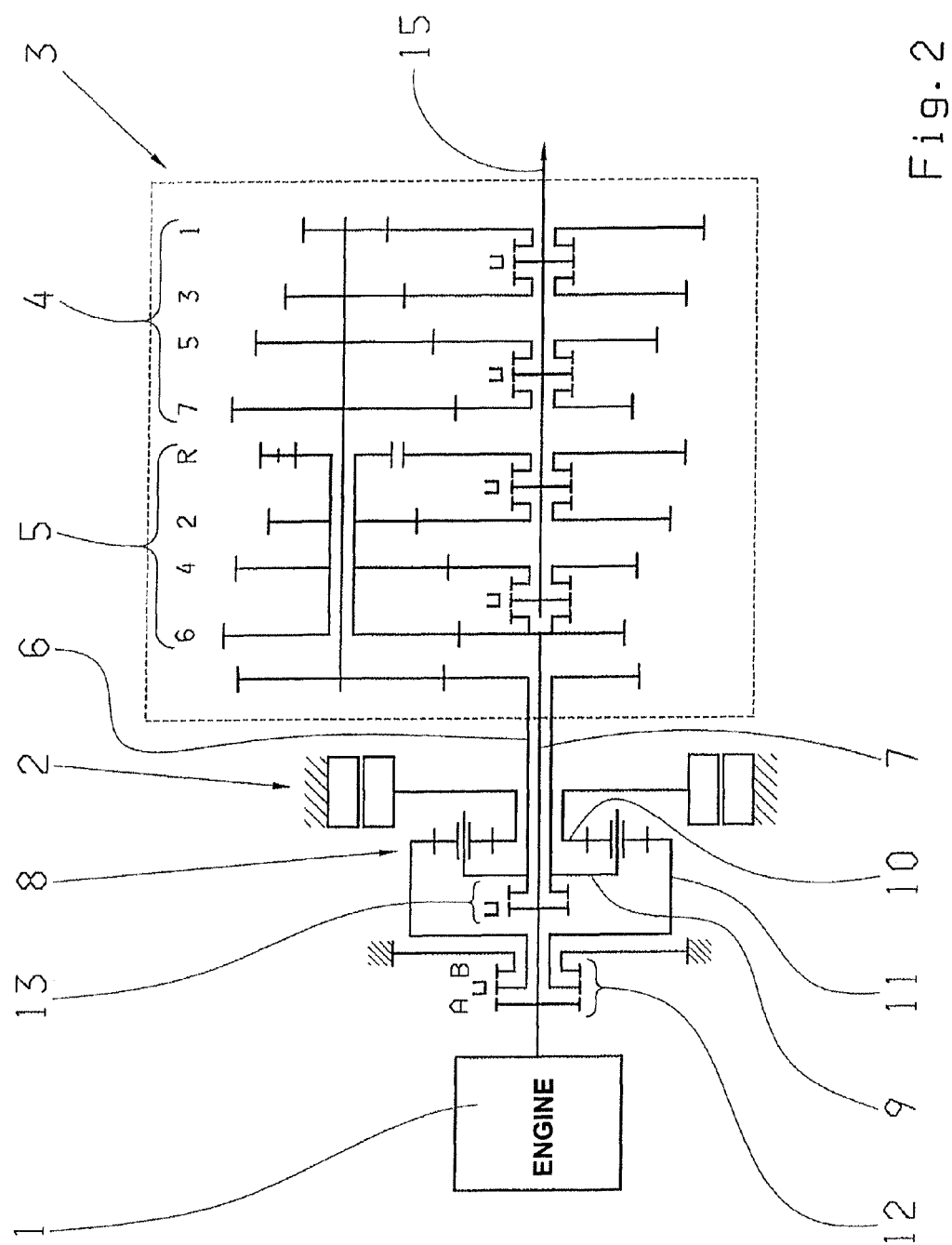
FIG. 2: A schematic representation of a drive-train according to the invention with a device according to the invention, according to a second example embodiment of the invention.

FIG. 2 shows a variant embodiment of the invention in which the separator clutch 14 is absent but which in all other details is the same as the example embodiment shown in FIG. 1. Thus, in FIG. 2 the internal combustion engine 1 is coupled to the second transmission input shaft 7 of the second partial transmission 5 without any clutch.

When the separator clutch 14 is present, then if the separator clutch 14 is open the electric machine 2 can also use the gears of the second partial transmission 5 for purely electric driving.

In contrast, if as shown in FIG. 2 the separator clutch 14 is absent, then for purely electric driving the electric machine 2 can use the gears of the first partial transmission 4, but only when the internal combustion engine 1 is switched off.

When the first shifting element 12 is in its first shift position A, the planetary gear set 8 acts as a superposition gear system.

In the closed shift position A of the first shifting element 12, for example when the separator clutch 14 is closed, with a gear engaged in the first partial transmission 4 and the second partial transmission 5 in neutral, electro-dynamic starting is possible, i.e. with the electric machine 2 operating as a generator so as to charge an electrical energy accumulator more intensely. In that case the second shifting element 13 serves as a bridging shifting element after the end of the starting process, so that the planetary gear set 8 can be brought to block rotation.

Moreover, when the first shifting element 12 is in its first shift position A powershifts can be carried out in the drive-train with rotational speed overlap of the internal combustion engine 1 and the electric machine 2. Then, at the planetary gear set 8 the electric machine 2 can support a torque of the internal combustion engine 1 with variable speed. The internal combustion engine 1 and the electric machine 2 then act together on the transmission output shaft 15 and the electric machine 2 can operate either as a motor or as a generator.

When the first shifting element 12 is in its second shift position B, the planetary gear set 8 acts as a constant gear.

In the closed shift position B of the first shifting element 12, purely electric starting off is possible by operating the electric machine 2 as a motor, namely with more intense discharging of an electrical energy accumulator. In this case a higher starting torque can be provided by the planetary gear set 8 working as a constant gear.

Furthermore, in the closed shift position B of the first shifting element 12 a powershift can be carried out, in which during the gearshift, the electric machine 2 can provide torque at the drive output by discharging an electrical energy accumulator. In this case the internal combustion engine 1 does not contribute to the output torque on the transmission output shaft 15.

A shifting strategy for the first shifting element 12 provides that when the hybrid vehicle is at rest or driving at a low driving speed, the first shifting element 12 is closed or moved to its shift position B when the charge condition of an electrical energy accumulator that co-operates with the electric machine 2 exceeds a defined limit value. This defined limit value for the charge condition of the electrical energy accumulator is preferably chosen such that purely electric driving from rest with the electric machine 2 operating as a motor and with the first shifting element 12 in its second shift position B is possible.

If the charge condition of the electrical energy accumulator is lower than the limit value, the first shifting element 12 is closed in its shift position A in order to be able to start up, free from wear, electro-dynamically with the electric machine 2 operating as a generator, even when the charge condition of the electrical energy accumulator is low.

At the first shifting element 12, the shift position B is also chosen if, with the internal combustion engine 1 switched off, it is desired to move off under purely electric power. In that case the separator clutch 14 is preferably opened and, by way of the planetary gear set 8 serving as a constant gear, the electric machine 2 can provide a relatively large starting torque, reaching its maximum possible power earlier as the hybrid vehicle accelerates.

Moreover, at the first shifting element 12 the shift position B is preferably chosen when braking is carried out by means of the electric machine 2, i.e. during recuperation, so that the internal combustion engine 1 can be decoupled and switched off, namely by opening the separator clutch 14 and disconnecting the internal combustion engine 1.

Shift position A for the first shifting element 12 is chosen in particular when carrying out powershifts of the drive-train, namely particularly when a less powerful electric machine 2 has been installed. When the shift position A is closed at the first shifting element 12, more drive torque can be delivered to the transmission output shaft 15 while carrying out a gearshift because the internal combustion engine 1 can lastingly deliver power by way of the planetary gear set 8. In contrast, in shift position B the electric machine 2 alone has to maintain the traction force of the transmission output shaft 15. Moreover, when shift position A is chosen at the first shifting element 12, while carrying out powershifts via the planetary gear set 8, the torque variation of the internal combustion engine 1 is uniform, whereby emissions can be reduced. When the first shifting element 12 is in shift position B, carrying out powershifts produces a load reduction at the internal combustion engine 1 and a load build-up after carrying out the powershift, which can give rise to higher emissions.

If in addition to the shift positions A and B, the first shifting element 12 also has a third shift position in which the third element of the planetary gear set 8, namely in FIG. 1 the ring gear 11, is decoupled both from the second transmission input shaft 7 and from the housing, this third shift position of the first shifting element 12 is used in particular during steady driving of the hybrid vehicle, i.e. when little generator-produced energy is needed, since in this shift position the electric machine 2 can be decoupled and stopped in order to avoid zero-load losses. Besides, if the electric machine develops a fault the third shift position of the first shifting element 12 can be chosen in order to enable driving operation exclusively powered by the internal combustion engine 1 even if the electric machine has broken down.

Further particular features of the drive-train of FIG. 1 consist in that the first partial transmission 4 can always be synchronized by means of a rotational speed regulated electric machine 2, either directly in shift position B of the first shifting element 12 or indirectly by way of the planetary gear set 8 in shift position A of the first shifting element 12.

The second partial transmission 5 is synchronized either when the separator clutch 14 and the second shifting element 13 are open by synchronization in the transmission 3, or by speed regulation of the internal combustion engine 1 with at least partial closure of the separator clutch 14, or in shift position A of the first shifting element 12 by speed regulation of the electric machine 2 indirectly by way of the planetary gear set 8.

In the example embodiment shown in FIG. 1 the first shifting element 12 and the second shifting element 13 are both in the form of interlocking shifting elements. In FIG. 1 the separator clutch 14 is a friction clutch.

At this point it should be said that the separator clutch 14, which as already mentioned is an optional component, can also be in the form of an interlocking claw clutch. In that case electro-dynamic starting with the first shifting element 12 closed in shift position B is nevertheless still possible since the separator clutch 14 is then closed in any event.

However, starting purely by means of the internal combustion engine without the electric machine 2 is only possible when the separator clutch 14 is a friction clutch.

To reduce the structural space required and also the costs, the separator clutch 14 can even be an unsynchronized claw clutch. In that case, for example, purely electric driving with the first shifting element 12 closed in shift position B, electro-dynamic starting with the first shifting element 12 in shift position A and hybrid starting are all possible. In contrast, starting exclusively by means of the internal combustion engine 1 is in this case not possible.

Before describing, below, preferred methods for operating the drive-train or a device of such a drive-train, variants of the example embodiment in FIG. 1 will first be discussed with reference to FIGS. 2 to 7.

As already explained, FIG. 2 shows a variant of FIG. 1 in which there is no separator clutch 14, i.e. in which the internal combustion engine 1 is coupled without any clutch to the second input shaft 7 of the second partial transmission 5. In this case the electric machine 2 can exclusively use the gears of the first partial transmission 4 for purely electric driving when the internal combustion engine 1 is switched off. The internal combustion engine 1 is then decoupled from the transmission output shaft 15 by virtue of an open second shifting element 13 and by a second partial transmission 5 in the neutral position. In the variant shown in FIG. 2 the second partial transmission 5 can be synchronized either by regulating the speed of the internal combustion engine 1, or by electro-dynamic powershifts by means of the planetary gear set 8 acting as a superposed gear system in shift position A.

In the example embodiment of FIG. 2, starting purely by means of the internal combustion engine 1 without co-rotation of the electric machine 2 is not possible. Also, in some circumstances the opening of the drive-train under load, for example during full braking, may not be possible.

In the variant shown in FIG. 2 an auxiliary starter device may be present because sometimes the internal combustion engine 1 cannot be drag-started by the electric machine 2.

Figure 3:
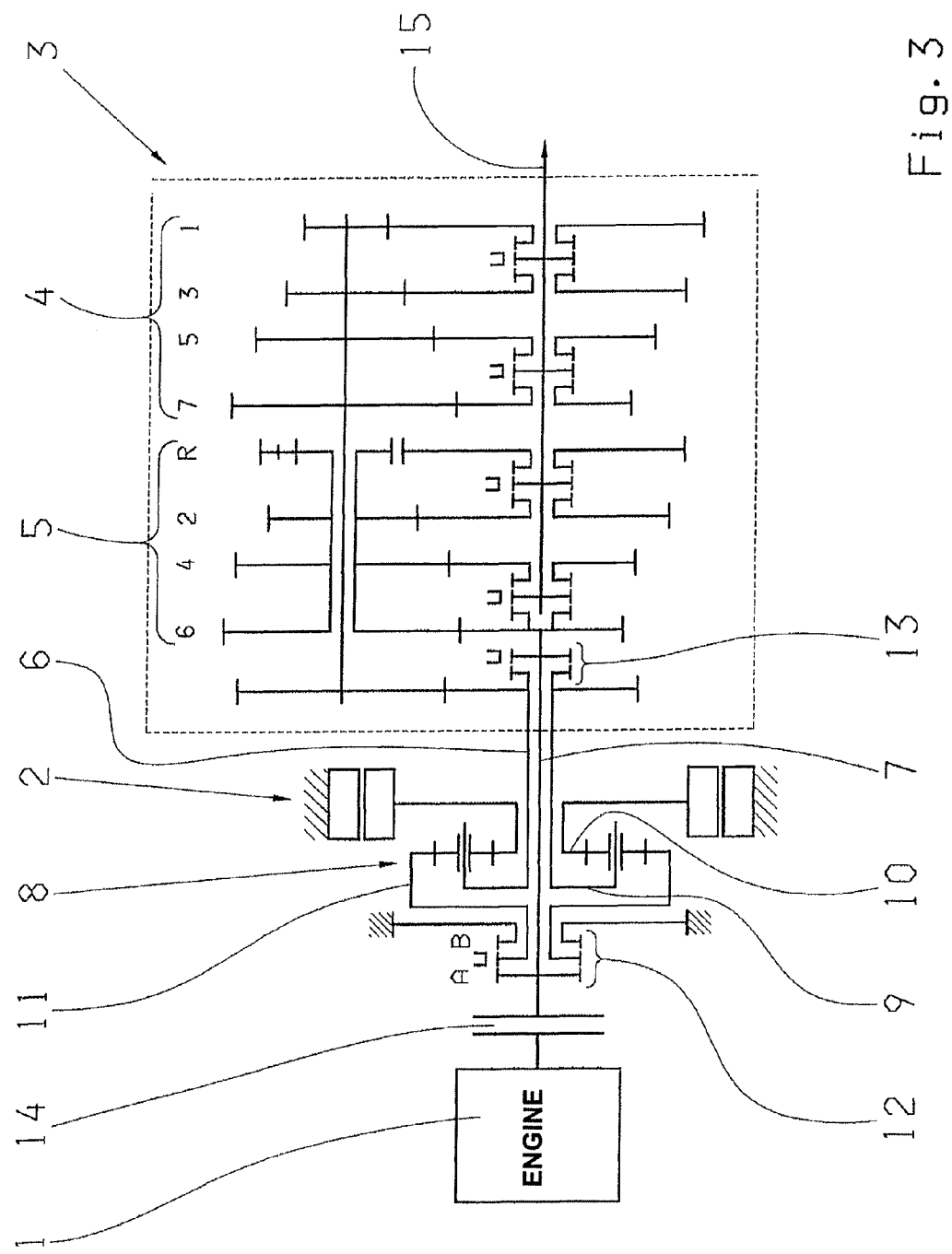
FIG. 3: A schematic representation of a drive-train according to the invention with a device according to the invention, according to a third example embodiment of the invention.

FIG. 3 shows a variant of the invention in which, other than in the example embodiment of FIG. 1, the second shifting element 13 is integrated in a gearset of the transmission 3. This integration of the second shifting element 13 in a gearset of the transmission 3 is advantageous since in that case the second shifting element 13 is accessible from outside without carrying out a rotation. In the variants of FIGS. 1 and 2 a rotation must be carried out for the actuation of the second shifting element 13.

Figure 4:
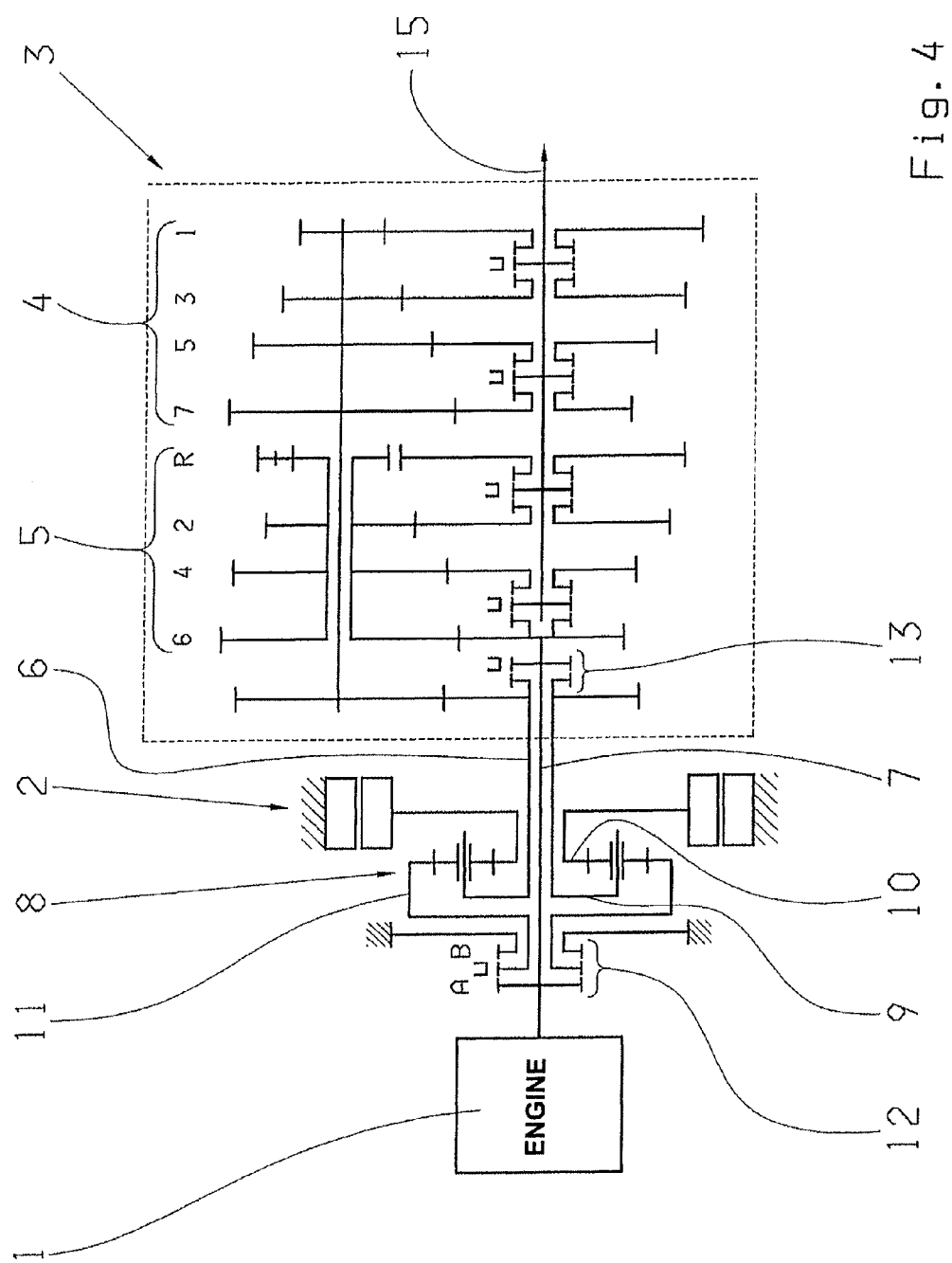
FIG. 4: A schematic representation of a drive-train according to the invention with a device according to the invention, according to a fourth example embodiment of the invention.

In the variant in FIG. 4, which corresponds in essence to the variant shown in FIG. 2, in common with the variant in FIG. 3, the second shifting element 13 is also integrated in a gearset of the transmission 3. Consequently, the variant in FIG. 4 corresponds to the variant in FIG. 3 without a separator clutch 14.

Figure 5:
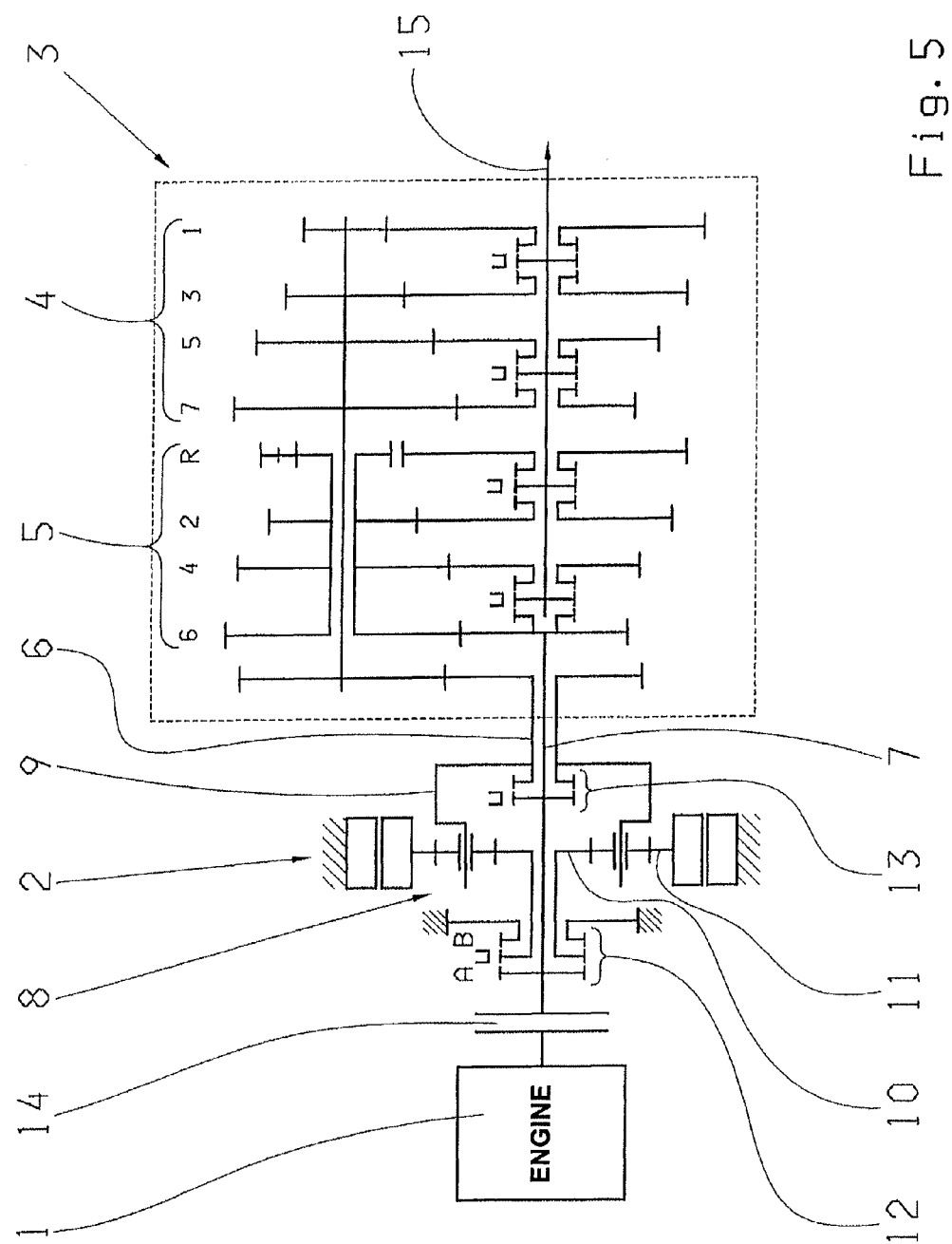
FIG. 5: A schematic representation of a drive-train according to the invention with a device according to the invention, according to a fifth example embodiment of the invention.

A further variant of the invention is shown in FIG. 5 wherein, in the variant in FIG. 5, the connection of the planetary gear set 8 is different.

Thus, in the variant in FIG. 5 the first element of the planetary gear set 8, to which the first transmission input shaft 6 of the first partial transmission 4 is permanently connected, is the carrier 9 of the planetary gear set 8. The second element of the planetary gear set, to which the electric machine 2 is permanently connected, is the ring gear 11 in FIG. 5. The third element, which depending on the shift position of the first shifting element 12 is connected to the second transmission input shaft 7 in shift position A or connected fixed to the housing in shift position B, is the sun gear 10 in the variant in FIG. 5.

The variant shown in FIG. 5 is particularly advantageous when the drive-train has an electric machine 2 that can produce a high torque but in which the internal combustion engine 1 produces a weak torque.

In the variant shown in FIG. 5, the second shifting element 13 is positioned outside the transmission 3.

Figure 6:
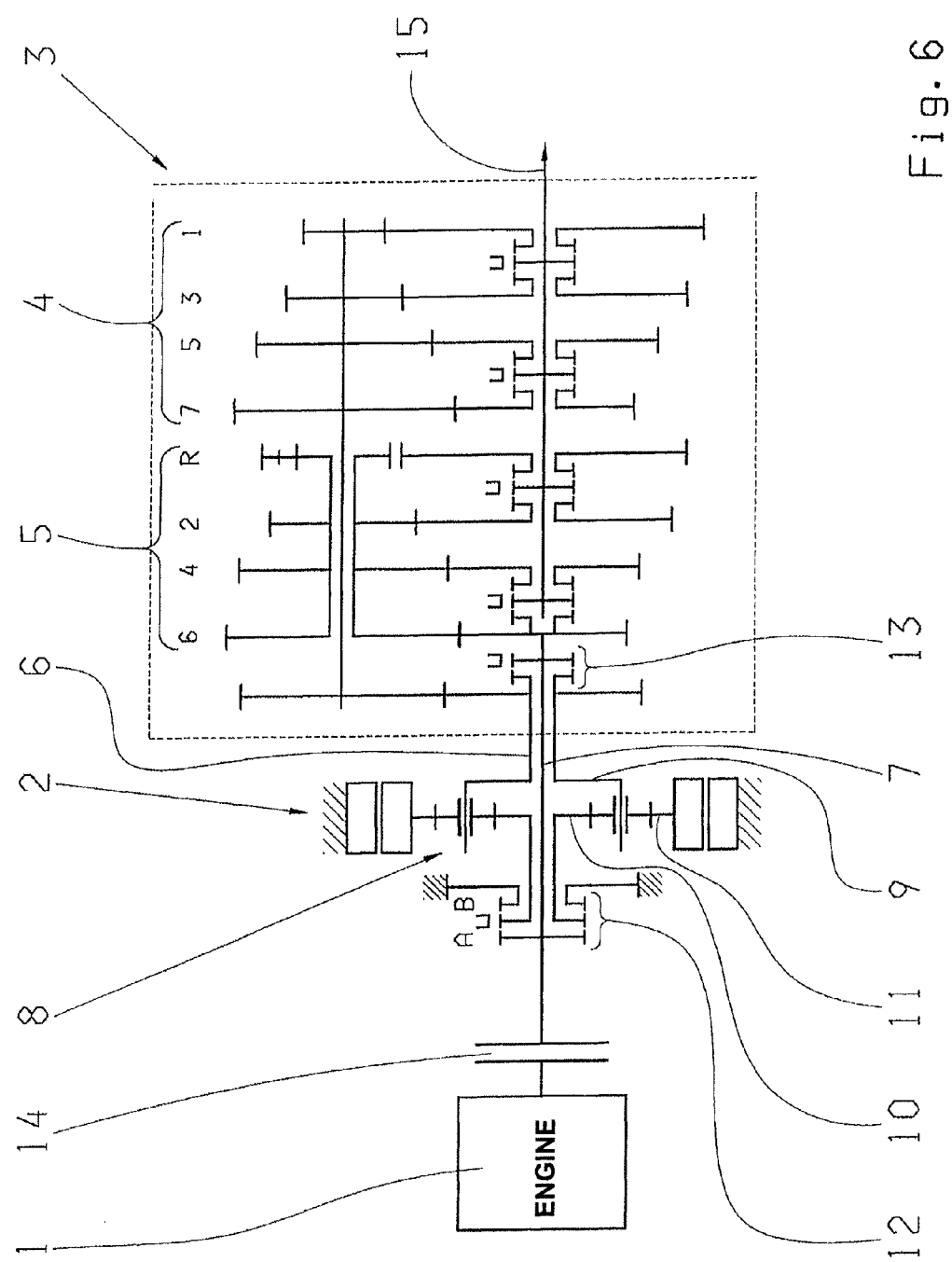
FIG. 6: A schematic representation of a drive-train according to the invention with a device according to the invention, according to a sixth example embodiment of the invention.

In FIG. 6, which as regards the connection of the planetary gear set 8 corresponds to the FIG. 5 variant, the second shifting element 13 is again integrated in the transmission 3.

Moreover, in the FIG. 5 and FIG. 6 variants the separator clutch 14 can be omitted.

Furthermore, although this is not illustrated, another connection mode of the planetary gear set 8 is also conceivable. Particularly if the planetary gear set 8 is designed as a so-termed plus gearset, the electric machine 2 can be coupled permanently to the sun gear of the planetary gear set and the first transmission input shaft 6 permanently to the ring gear 11 of the planetary gear set, and depending on the shift position of the first shifting element 12, the carrier of the planetary gear set is then either coupled to the second transmission input shaft or coupled to the housing.

In all the example embodiments of FIGS. 1 to 6, in each case the first shifting element 12 and the second shifting element 13 are in the form of interlocking claw clutches.

Figure 7:
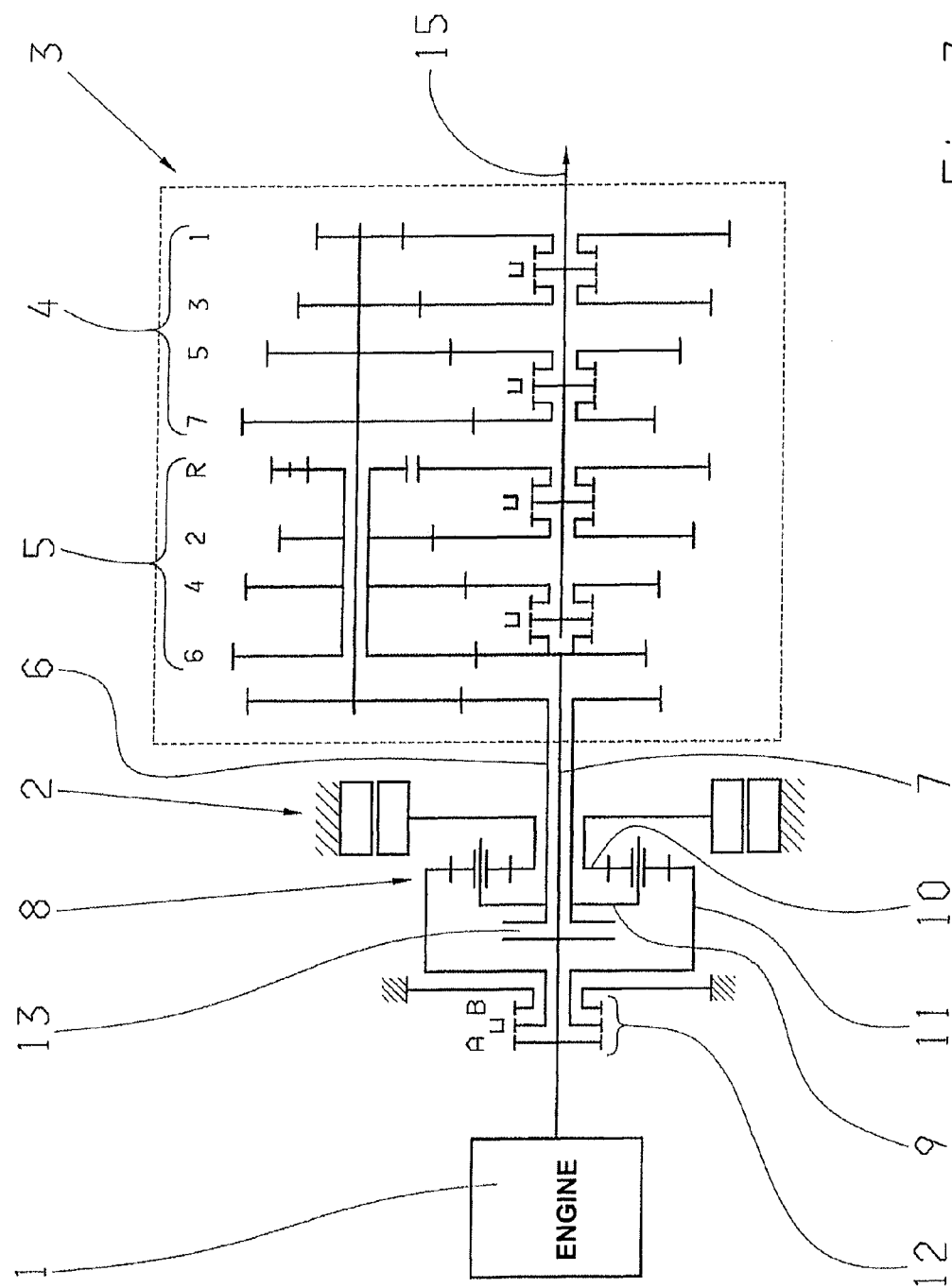
FIG. 7: A schematic representation of a drive-train according to the invention with a device according to the invention, according to a seventh example embodiment of the invention.

In contrast, FIG. 7 shows a variant of the invention in which the second shifting element 13 is a friction clutch.

Thus, the variant in FIG. 7 corresponds in essence to the variant shown in FIG. 2. In the variants in FIG. 1 and FIGS. 3 to 6 as well, the friction clutch shown in FIG. 7 can be used as the second shifting element 13.

Below, preferred methods are described in detail.

A first method according to the invention for operating a drive-train as shown in FIGS. 1 to 7 or a device as shown in FIGS. 1 to 7 which, as a constituent of the drive-train, serves to connect the internal combustion engine 1, electric machine 2 and transmission 3, concerns the shifting of the first shifting element 12 from its first shift position A to its second shift position B.

According to this method, when the second shifting element 13 is closed and engaged in the first partial transmission 4, or when the second shifting element 13 is open and a gear is engaged in the second partial transmission 5, to shift the first shifting element 12 from the first shift position A to the second shift position B, the load on the electric machine 2 is first reduced, preferably the load on the electric machine 2 is reduced completely down to zero. The load previously applied by the electric machine 2 can be transferred wholly or partially to the internal combustion engine 1. After this the first shift position A at the first shifting element 12 can be disengaged free from load and then the first shifting element 12, in relation to the second shift position B, is synchronized by means of the electric machine 2, preferably by regulating the speed of the electric machine 2, so that at the first shifting element 12 the second shift position B can be engaged free from load. During this load-free shifting of the first shifting element 12 from shift position A to shift position B, the internal combustion engine 1 delivers drive output torque to the transmission output shaft 15, and this, either by way of the first partial transmission 4 if the second shifting element 13 is closed, or by way of the second partial transmission 5 if the second shifting element 13 is open.

A second method according to the invention concerns the shifting of the shifting element 12 from the second shift position B to the first shift position A, namely when the second shifting element 13 is closed and engaged in the first partial transmission 4, or when the second shifting element 13 is open and a gear is engaged in the second partial transmission 5. In this case, to shift the first shifting element 12 from the second shift position B to the first shift position A the electric machine 2 is first made preferably completely load free and its load is at least partially transferred to the internal combustion engine 1. After that the shift position B can be disengaged while free from load and the electric machine 2 can synchronize the first shifting element 12 in relation to the first shift position A, so that the first shift position A can be engaged in the first shifting element 12 without load. During this the internal combustion engine 1 supports the output torque at the drive output shaft 15 of the transmission 3, either when the second shifting element 13 is closed by way of the first partial transmission 4 or, if the second shifting element 13 is open, by way of the second partial transmission 5.

Other methods according to the invention concern a drive-train in which the second shifting element 13 is in the form of a frictional shifting element 13 that can be operated with slip (see FIG. 7), namely on the one hand the shifting of the first shifting element 12 from the first shift position A to the second shift position B and conversely, from the second shift position B to the first shift position A.

A shift of the first shifting element 12 from shift position B to shift position A without traction force interruption in the case of a frictional, initially open shifting element 13 takes place, for example, during the transition from purely electric crawling in shift position B to electro-dynamic crawling in shift position A. Such a shift can for example be necessary if electric crawling has been taking place for a long time by means of a motor-driven electric machine 2, and an electrical energy accumulator has run down. In such a case a change must be made to electro-dynamic crawling in shift position A in order, during this electro-dynamic crawling, to be able to operate the electric machine 2 as a generator and charge up the energy accumulator again.

Accordingly, in the initial condition of this method the shift position B is closed at the shifting element 12, the second shifting element 13 is open, the internal combustion engine 1 is running, a gear is engaged in the first partial transmission 4, and the second partial transmission 5 is in its neutral position. Starting from this initial condition, a load transfer first takes place from the electric machine 2 to the second shifting element 13, in that the second shifting element 13 is at least partially closed and, particularly at low driving speeds, is operated with slip, whereby the internal combustion engine 1 takes over the torque provided by the electric machine 2, preferably completely. Thus, at the electric machine 2 along with the torque reduction there is a complete load reduction and thereafter the second shift position B can be opened or disengaged while free from load. Then, by speed regulation of the electric machine 2 the first shifting element 12 is synchronized in relation to shift position A in such manner that in relation to the shift position A the shifting element 12 adopts the current rotational speed of the internal combustion engine 1, so that the shift position A can then be engaged in the first shifting element 12 while free from load. Then, the load at the electric machine 2 is reduced so that the second shifting element 13 becomes load free. During this the electric machine 2 supports the torque provided by the internal combustion engine 1 so that no torque is any longer transmitted by the second shifting element 13. In this case the engine torque of the internal combustion engine 1 is preferably reduced in such manner that the transmission input torque is not increased. The planetary gear set 8 then operates with a gear ratio and the shifting element 13 without one. Thereafter the shifting element 13 can be opened.

A converse change of the first shifting element 12 from shift position A to shift position B without traction force interruption, with the second, frictional shifting element 13 initially open, can be carried out for example during a transition from electro-dynamic crawling to purely electric crawling, this taking place in particular when electro-dynamic crawling with the electric machine 2 operating as a generator has been in progress for a long time and the electrical energy accumulator has been charged too much. In this case the transition to purely electric crawling with the electric machine 2 operating as a motor can take place in order in this way to boost the discharging of the electrical energy accumulator. Thus, at the start of this process, the shift position A is closed at the first shifting element 12, the second shifting element 13 is open, the internal combustion engine 1 is running, a gear is engaged in the first partial transmission 4 and the second partial transmission 5 is in a neutral position. Then, the load is transferred from the electric machine 2 to the internal combustion engine 1 at low driving speeds by operating the second shifting element 13 in slip. Preferably the load at the electric machine 2 is eliminated completely so that in relation to shift position A the shifting element 12 is free from load and the shift position A can be disengaged while load free. Thereafter the shifting element 12 is synchronized in relation to shift position B, preferably by operating the electric machine 2 in a controlled manner, following which the shift position B can be engaged in the first shifting element 12 while free from load. After this, preferably there is a load transfer from the internal combustion engine 1 to the electric machine 2, namely in such manner that the load increases at the electric machine 2 and decreases at the internal combustion engine 1.

By virtue of the load reduction at the internal combustion engine 1, the second shifting element 13 becomes load free. Then, the second shifting element 13 is opened. From then on electric crawling with the electric machine 2 operating as a motor can take place via a gear in the first partial transmission 4. The internal combustion engine 1 is decoupled since shift position A is disengaged, the second shifting element 13 is open, and the second partial transmission 5 is in neutral. The internal combustion engine 1 can therefore be run at idling speed or switched off.

A further method according to the invention concerns the shifting of the first shifting element 12 from its first A to its second B shift position while the drive-train is in crawling operation under load and the separator clutch 14 is intermittently slipping. In this case crawling operation means that the driving speed of the drive-train is so low that when the separator clutch 14 is closed, it is not possible to bridge across the electro-dynamic operation in shift position A of the first shifting element 12, because otherwise the running speed of the internal combustion engine 1 would be too low. This can be counteracted by a separator clutch 14 operated with intermittent slip. Without a separator clutch 14, this shifting process at the shifting element 12 can only take place with traction force interruption.

The starting condition for this method for shifting the shifting element 12 from shift position A to shift position B during crawling operation under load with an intermittently slipping separator clutch 14, is such that in the shifting element 12 the shift position A is engaged, the separator clutch 14 is closed, a gear is engaged in the first partial transmission 4, the second partial transmission 5 is in neutral and the second shifting element 13 is open. Starting from this initial situation of the drive-train, the separator clutch 14 is first brought to a slipping condition by reducing its transmission capacity. Then, the rotational speed of the second transmission input shaft 7 is reduced to that of the first transmission input shaft 6 so that block rotation can be realized at the planetary gear set 8. The speed regulation required for this takes place by regulating the torque of the electric machine 2 and the torque transmitted by the separator clutch 14. Then the second shifting element 13 is closed, or alternatively a gear is engaged in the second partial transmission 5.

To engage a gear in the second partial transmission 5, the speed of the second transmission input shaft 7 must be synchronized with the gear in the second partial transmission 5, i.e. the block rotation of the planetary gear set 8 is abandoned. Once the second shifting element 13 has been closed or a gear engaged in the second partial transmission 5, the load on the electric machine 2 can be reduced. Accordingly the load on the internal combustion engine 1 and the separator clutch 14 is adapted in order to ensure an approximately constant drive torque at the transmission output shaft 15. During this the torque of the internal combustion engine 1 and the torque transmitted by the separator clutch 14 are preferably increased, since the gear ratio of the planetary gear set 8 is no longer effective. But if the separator clutch 14 would be too heavily loaded, the torque of the internal combustion engine 1 is not increased and instead a reduction of the traction force on the transmission output shaft 15 is allowed for. As soon as the electric machine 2 is free from load, the shift position A in the shifting element 12 can be disengaged while load free, then relative to shift position B the shifting element 12 is synchronized by regulating the speed of the electric machine 2, and shift position B is engaged. Thereafter the electric machine 2 takes over the drive torque with a load build-up at the electric machine 2. The load on the internal combustion engine 1 then decreases. The shifting element 13 can then be opened again or the gear in the second partial transmission 5 can be disengaged. The separator clutch 14 can be opened or closed. The internal combustion engine 1 supports the drive torque either via the second partial transmission 5 if the shifting element 13 is open or via the partial transmission 4 if the shifting element 13 is closed, while the shifting element 12 is shifted between shift position A and shift position B while free from load. During this the separator clutch 14 is at least partially slipping.

A further method according to the invention concerns the shifting of the first shifting element 12 from the second shift position B to the first shift position A during crawling operation of the drive-train under load with an intermittently slipping separator clutch 14, crawling operation being understood in this case to mean a situation of the drive-train in which its driving speed is so low that the internal combustion engine 1 cannot run in a fixed gear because otherwise the running speed of the internal combustion engine would be too low.

This situation can be counteracted by an intermittently slipping separator clutch 14. If there is no separator clutch 14 the shift can only take place with traction force interruption. Such a shift may become necessary if, during purely electric crawling, the electrical energy accumulator is discharged too much and a change has to be made to electro-dynamic crawling.

The initial situation of the drive-train during purely electric crawling is that in the shifting element 12 the shift position B is engaged, the separator clutch 14 is open or closed, a gear is engaged in the first partial transmission 4, the second partial transmission 5 is in neutral and the second shifting element 13 is open. In the method according to the invention, first of all if the separator clutch 14 was previously closed it is opened, or if it was previously open it is left open, and then the second shifting element 13 is closed or alternatively a gear is engaged in the second partial transmission 5. Synchronizing the second transmission input shaft of the second partial transmission required for engaging the gear takes place either with the separator clutch 14 open by synchronizing in the gearset of the transmission or by partially closing the separator clutch 14, by means of the internal combustion engine 1. Once the second shifting element 13 has been closed or a gear has been engaged in the second partial transmission 5, drive torque is transferred to the internal combustion engine 1 by way of the separator clutch 14 operated with slip, for which purpose the transmission capacity of the separator clutch 14 is correspondingly increased. At the same time as the load build-up at the internal combustion engine 1, there is a load reduction at the electric machine 2 so that at the shifting element 12 the shift position B can then be disengaged while free from load. Then, by means of a speed-regulated electric machine 2 the shifting element 12 is synchronized in relation to shift position A and shift position A is engaged free from load. The electric machine 2 then supports sufficient torque for the drive torque to pass from the internal combustion engine 1 via the separator clutch 14 and via the planetary gear set 8, whereas the second shifting element 13 or the gear engaged in the second partial transmission 5 no longer transmits any load. During the load reduction at the electric machine 2, the torque of the internal combustion engine 1 or the separator clutch 14 is adapted in such manner that the drive torque acting on the transmission output shaft 15 remains approximately constant.

The torque of the internal combustion engine 1 or separator clutch 14 can be reduced since the gear ratio of the planetary gear set 8 is effective. Thereafter, either the load-free shifting element 13 is open or the load-free gear in the second partial transmission 5 is disengaged. When the speed of the second input shaft 7 of the second partial transmission 5 is synchronized with the speed of the internal combustion engine 1, i.e. when the separator clutch 14 is synchronized, the separator clutch 14 can be closed. This synchronization takes place by regulating the torque delivered by the electric machine 2 and transmitted by the separator clutch 14. When the separator clutch 14 has been closed, the required shifting process has been completed and crawling operation can take place electro-dynamically in shift position A with the electric machine 2 operating as a generator.

INDEXES

1 Internal combustion engine
2 Electric machine
3 Transmission
4 First partial transmission
5 Second partial transmission
6 First transmission input shaft
7 Second transmission input shaft
8 Planetary gear set
9 Carrier
10 Sun gear
11 Ring gear
12 First shifting element
13 Second shifting element
14 Separator clutch
15 Transmission output shaft

The invention claimed is:

1. A device for a drive-train of a hybrid vehicle, the device comprising:
 a planetary gear set (8) comprising three elements, the three elements comprising a carrier (9), a sun gear (10) and a ring gear (11);
 a first element, of the three elements (9, 10, 11) of the planetary gear set, forming a fixed connection of a first transmission input shaft (6) with a first partial transmission (4) of a transmission (3), and a second element, of the three elements (9, 10, 11) of the planetary gear set, forming a fixed connection with an electric machine (2) of a hybrid drive;
 a first shifting element (12) having a first shift position (A) and a second shift position (B);
 in the first shift position (A) of the first shifting element (12), a third element of the three elements (9, 10, 11) of the planetary gear set is connected to a second transmission input shaft (7) of a second partial transmission (5) of the transmission, and an internal combustion engine (1) of the hybrid drive being couplable to the second transmission input shaft (7);
 in the second shift position (B) of the first shifting element (12), the third element of the three elements (9, 10, 11) of the planetary gear being connected to one of a housing and a stator;
 a second shifting element (13) being engageable and disengageable; and
 when the second shifting element (13) is engaged, the first and the second transmission input shafts (6, 7) of the first and the second partial transmissions (4, 5) are coupled to one another, and when the second shifting element (13) is disengaged, the first and the second transmission input shafts (6, 7) of the first and the second partial transmissions (4, 5) are separated from one another.

2. The device according to claim 1, wherein the planetary gear set (8), in the first shift position (A) of the first shifting element (12), serves as a superposition gear-train and, in the second shift position (B) of the first shifting element (12), the planetary gear set (8) serves as a constant gear.

3. The device according to claim 1, wherein, when the first shifting element (12) is in a third disengaged position, the third element of the planetary gear set (8) is freely rotatable.

4. The device according to claim 1, wherein when the second shifting element (13) is engaged, the first element of the planetary gear set (8) is coupled, in a fixed manner, to both of the first and the second transmission input shafts (6, 7) of the first and the second partial transmissions (4, 5), and when the second shifting element (13) is disengaged, the first element of the planetary gear set (8) is couplable in a fixed manner exclusively to the first transmission input shaft (6) of the first partial transmission (4).

5. A drive-train of a hybrid vehicle comprising a hybrid drive comprising:
 an internal combustion engine (1);
 an electric machine (2); and
 a transmission (3) comprising first and second partial transmissions (4, 5) connected in parallel with one another, each of the first and the second partial transmissions having a respective transmission input shaft (6, 7),
a planetary gear set (8) comprising the elements of a carrier (9), a sun gear (10) and a ring gear (11), a first element of the elements (9, 10, 11) of the planetary gear set is connected fixed to a first transmission input shaft (6) of a first partial transmission (4) and a second element of the elements (9, 10, 11) of the planetary gear set is connected fixed to the electric machine (2) of the hybrid drive,
a first shifting element (12) by which, in a first shift position (A) of the first shifting element (12), a third element of the elements (9, 10, 11) of the planetary gear set is connectable to a second transmission input shaft (7) of a second partial transmission (5) of the transmission, to which in addition the internal combustion engine (1) of the hybrid drive is couplable, and
in a second shift position (B) of the first shifting element (12), the third element of the elements (9, 10, 11) of the planetary gear set is connectable to one of a housing or a stator,
a second shifting element (13) by which, when the second shifting element (13) is engaged, the first and the second transmission input shafts (6, 7) of the first and the second partial transmissions (4, 5) are coupled to one another, while, when the second shifting element (13) is disengaged, the first and the second transmission input shafts (6, 7) of the first and the second partial transmissions (4, 5) are separable from one another.

6. The drive-train according to claim 5, wherein the planetary gear set (8), in the first shift position (A) of the first shifting element (12), serves as a superposition gear-train and, in the second shift position (B) of the first shifting element (12), the planetary gear set (8) serves as a constant gear.

7. The drive-train according to claim 5, wherein the second transmission input shaft (7) of the second partial transmission (5) is continuously connected to the internal combustion engine (1).

8. The drive-train according to claim 5, wherein a separator clutch (14) couples the second transmission input shaft (7) of the second partial transmission (5) to the internal combustion engine (1).

9. The drive-train according to claim 5, wherein the second shifting element (13) is integrated in a gearset of the transmission (3).

10. The device according to claim 1, wherein the device is operated by a method of shifting the first shifting element (12) from the first shift position (A) to the second shift position (B), either when the second shifting element (13) is engaged and a gear is engaged in the first partial transmission (4), or when the second shifting element (13) is disengaged and a gear is engaged in the second partial transmission (5),
the electric machine (2) is first made completely free from load and its load is transferred fully, or in part to, the internal combustion engine (1), then the first shift position (A) is disengaged while free from load, then by the electric machine (2), the first shifting element (12) is synchronized in relation to the second shift position (B), and then the second shift position (B) is engaged free from load, whereby the internal combustion engine (1) delivers torque to a transmission output shaft (15) of the transmission (3) via the first partial transmission (4) if the shifting element (13) is engaged and, via the second partial transmission (5), if the second shifting element (13) is disengaged.

11. The drive-train according to claim 5, wherein the drive-train is operated to shift the first shifting element (12) from the first shift position (A) to the second shift position (B), either when the second shifting element (13) is engaged and a gear is engaged in the first partial transmission (4), or when the second shifting element (13) is disengaged and a gear is engaged in the second partial transmission (5),
the electric machine (2) is first made completely free from load and its load is transferred fully, or in part, to the internal combustion engine (1), then the first shift position (A) is disengaged while free from load, then by means of the electric machine (2), the first shifting element (12) is synchronized in relation to the second shift position (B), and then the second shift position (B) is engaged free from load, whereby the internal combustion engine (1) delivers torque to a transmission output shaft (15) of the transmission (3) via the first partial transmission (4) if the shifting element (13) is engaged and, via the second partial transmission (5), if the second shifting element (13) is disengaged.

12. The device according to claim 1, wherein the device is operated by a method to shift the first shifting element (12) from the second shift position (B) to the first shift position (A), either when the second shifting element (13) is engaged and a gear is engaged in the first partial transmission (4), or when the second shifting element (13) is disengaged and a gear is engaged in the second partial transmission (5),
the electric machine (2) is first made completely free from load and its load is transferred fully, or in part, to the internal combustion engine (1), then the second shift position (B) is disengaged while free from load, then the first shifting element (12) is synchronized by the electric machine (2) in relation to the first shift position (A) and, thereafter, the first shift position (A) is engaged while free from load, whereby the internal combustion engine (1) delivers torque to a transmission output shaft (15) of the transmission (3), via the first partial transmission (4), if the second shifting element (13) is engaged and via the second partial transmission (5) if the second shifting element (13) is disengaged.

13. The drive-train according to claim 5, wherein the drive-train is operated by a method to shift the first shifting element (12) from the second shift position (B) to the first shift position (A), either when the second shifting element (13) is engaged and a gear is engaged in the first partial transmission (4), or when the second shifting element (13) is disengaged and a gear is engaged in the second partial transmission (5),
the electric machine (2) is first made completely free from load and its load is transferred fully, or in part, to the internal combustion engine (1), then the second shift position (B) is disengaged while free from load, then the first shifting element (12) is synchronized by the electric machine (2) in relation to the first shift position (A) and, thereafter, the first shift position (A) is engaged while free from load, and the internal combustion engine (1) delivers torque to a transmission output shaft (15) of the transmission (3), via the first partial transmission (4), if the second shifting element (13) is engaged and, via the second partial transmission (5), if the second shifting element (13) is disengaged.

14. The device according to claim 1, wherein the device is operated by a method to shift the first shifting element (12) from the second shift position (B) to the first shift position (A) without traction force interruption, when the second shifting element (13) is a friction shifting element that can be operated with slip and when the second shifting element (13) is initially disengaged,
the electric machine (2) is first made completely free from load and its load is transferred completely to the internal combustion engine (1) by the second shifting element (13) which, for that purpose, is at least partially engaged and can be operated with slip, then the second shift position (B) is disengaged while free from load, then by the electric machine (2), the first shifting element (12) is synchronized in relation to the first shift position (A) and the first shift position (A) is then engaged while free from load and, thereafter, load is built up at the electric machine (2) and reduced at the internal combustion engine (1), so that the second shifting element (13) becomes load-free and is then disengaged.

15. The drive-train according to claim 5, wherein the drive-train is operated by a method to shift the first shifting element (12) from the second shift position (B) to the first shift position (A) without traction force interruption, when the second shifting element (13) is a friction shifting element that can be operated with slip and when the second shifting element (13) is initially disengaged, the electric machine (2) is first made completely free from load and its load is transferred completely to the internal combustion engine (1) by the second shifting element (13) which, for that purpose, is at least partially engaged and can be operated with slip, then the second shift position (B) is disengaged while free from load, then by the electric machine (2), the first shifting element (12) is synchronized in relation to the first shift position (A) and the first shift position (A) is then engaged while free from load and, thereafter, load is built up at the electric machine (2) and reduced at the internal combustion engine (1), so that the second shifting element (13) preferably becomes load-free and is then opened.

16. The device according to claim 1, wherein the device is operated by a method to shift the first shifting element (12) from the first shift position (A) to the second shift position (B) without traction force interruption, when the second shifting element (13) is a friction shifting element that can be operated with slip and when the second shifting element (13) is initially disengaged, the electric machine (2) is first made completely free from load and its load is transferred completely to the internal combustion engine (1) by the second shifting element (13) which, for that purpose, is at least partially engaged and can be operated with slip, then the first shift position (A) is disengaged while free from load, then by the electric machine (2), the first shifting element (12) is synchronized in relation to the second shift position (B) and the second shift position (B) is then engaged while free from load and, thereafter, load is built up at the electric machine (2) and reduced at the internal combustion engine (1), so that the second shifting element (13) becomes load-free and is then disengaged.

17. The drive-train according to claim 5, wherein the drive-train is operated by a method to shift the first shifting element (12) from the first shift position (A) to the second shift position (B) without traction force interruption, when the second shifting element (13) is a friction shifting element that can be operated with slip and when the second shifting element (13) is initially disengaged, the electric machine (2) is first made completely free from load and its load is transferred completely to the internal combustion engine (1) by the second shifting element (13) which, for that purpose, is at least partially engaged and can be operated with slip, then the first shift position (A) is disengaged while free from load, then by the electric machine (2), the first shifting element (12) is synchronized in relation to the second shift position (B) and the second shift position (B) is then engaged while free from load and, thereafter, load is built up at the electric machine (2) and reduced at the internal combustion engine (1) so that the second shifting element (13) becomes load-free and is then disengaged.

18. The device according to claim 1, wherein the device is operated by a method to shift the first shifting element (12) from the first shift position (A) to the second shift position (B), when the second transmission input shaft (7) of the second partial transmission (5) is coupled to the internal combustion engine (1) by a frictional separator clutch (14) that can be operated with slip, and when the separator clutch (14) is initially fully engaged, and when the second shifting element (13) is initially disengaged, and when a gear is initially engaged in the first partial transmission (4) and when the second partial transmission (5) is initially in neutral, the separator clutch (14) is first operated with slip and a rotation speed of the second transmission input shaft (7) is approximated to a speed of the first transmission input shaft (6), then the second shifting element (13) is engaged or a gear is engaged in the second partial transmission (5), then the load at the electric machine (2) is reduced, then the first shift position (A) is disengaged, then by the electric machine (2), the first shifting element (12) is synchronized in relation to the second shift position (B), and then the second shift position (B) is engaged.

19. The drive-train according to claim 5, wherein the drive-train is operated by a method to shift the first shifting element (12) from the first shift position (A) to the second shift position (B), when the second transmission input shaft (7) of the second partial transmission (5) is coupled to the internal combustion engine (1) by a frictional separator clutch (14) that can be operated with slip, and when the separator clutch (14) is initially fully engaged, and when the second shifting element (13) is initially disengaged, and when a gear is initially engaged in the first partial transmission (4) and when the second partial transmission (5) is initially in neutral, the separator clutch (14) is first operated with slip and the rotation speed of the second transmission input shaft (7) is approximated to the speed of the first transmission input shaft (6), then the second shifting element (13) is engaged or a gear is engaged in the second partial transmission (5), then the load at the electric machine (2) is reduced, then the first shift position (A) is disengaged, then by the electric machine (2), the first shifting element (12) is synchronized in relation to the second shift position (B), and then the second shift position (B) is engaged.

20. The device according to claim 1, wherein the device is operated by a method to shift the first shifting element (12) from the second shift position (B) to the first shift position (A) when the second transmission input shaft (7) of the second partial transmission (5) is coupled to the internal combustion engine (1) by a frictional separator clutch (14) that can be operated with slip, and when the second shifting element (13) is initially disengaged, and when a gear is initially engaged in the first partial transmission (4) and when the second partial transmission (5) is initially in neutral, the separator clutch is first disengaged or kept disengaged, then the second shifting element (13) is engaged or a gear is engaged in the second partial transmission (5), then, with the separator clutch (14) operated with slip the load is increased at the internal combustion engine (1) and reduced at the electric machine (2), then the second shifting element (B) is disengaged, then the first shifting element (12) is synchronized by the electric machine (2) in relation to the first shift position (A) and, thereafter, the first shift position (A) is engaged.

21. The drive-train according to claim 5, wherein the drive-train is operated by a method to shift the first shifting element (12) from the second shift position (B) to the first shift position (A), when the second transmission input shaft (7) of the second partial transmission (5) is coupled to the internal combustion engine (1) by a frictional separator clutch (14) that can be operated with slip, and when the second shifting element (13) is initially disengaged, and when a gear is initially engaged in the first partial transmission (4) and when the second partial transmission (5) is initially in neutral, the separator clutch is first disengaged or kept disengaged, then the second shifting element (13) is engaged or a gear is engaged in the second partial transmission (5), then, with the separator clutch (14) operated with slip, the load is increased at the internal combustion engine (1) and reduced at the electric machine (2), then the second shifting element (B) is disengaged, then the first shifting element (12) is synchronized by the electric machine (2) in relation to the first shift position (A) and, thereafter, the first shift position (A) is engaged.

* * * * *